(12) United States Patent
Feldten

(10) Patent No.: US 7,212,988 B1
(45) Date of Patent: May 1, 2007

(54) TEST SCREENING OF VIDEOS

(76) Inventor: Guy W. Feldten, 16749 Anna Trail, Prior Lake, MN (US) 55372

(*) Notice: Subject to any disclaimer, the term of this patent is extended or adjusted under 35 U.S.C. 154(b) by 962 days.

(21) Appl. No.: 09/915,029

(22) Filed: Jul. 25, 2001

Related U.S. Application Data

(60) Provisional application No. 60/220,744, filed on Jul. 26, 2000.

(51) Int. Cl.
    *G06Q 10/00* (2006.01)
(52) U.S. Cl. .............................. 705/10; 725/22; 725/24
(58) Field of Classification Search .................. 705/10
    See application file for complete search history.

(56) References Cited

U.S. PATENT DOCUMENTS

| | | | | |
|---|---|---|---|---|
| 4,546,382 | A | * | 10/1985 | McKenna et al. ............. 725/14 |
| 4,974,085 | A | | 11/1990 | Campbell et al. |
| 5,093,786 | A | * | 3/1992 | Derks ........................ 455/3.01 |
| 5,361,200 | A | | 11/1994 | Weybright et al. |
| 5,446,919 | A | * | 8/1995 | Wilkins ........................ 725/35 |
| 5,504,519 | A | * | 4/1996 | Remillard .................... 725/10 |
| 5,508,731 | A | * | 4/1996 | Kohorn ........................ 725/24 |
| 5,550,928 | A | * | 8/1996 | Lu et al. ..................... 382/116 |
| 5,561,708 | A | * | 10/1996 | Remillard ................. 379/93.19 |
| RE35,449 | E | | 2/1997 | Derks |
| 5,724,357 | A | | 3/1998 | Derks |
| 5,812,642 | A | * | 9/1998 | Leroy ....................... 379/92.01 |
| 5,913,204 | A | | 6/1999 | Kelly |
| 5,937,037 | A | * | 8/1999 | Kamel et al. ............. 379/88.19 |
| 5,991,734 | A | | 11/1999 | Moulson |
| 6,088,722 | A | * | 7/2000 | Herz et al. .................. 709/217 |
| 6,161,137 | A | * | 12/2000 | Ogdon et al. ............... 709/224 |
| 2001/0003099 | A1 | * | 6/2001 | Von Kohorn ................ 463/40 |
| 2002/0059218 | A1 | * | 5/2002 | August et al. ................ 707/5 |
| 2004/0103150 | A1 | * | 5/2004 | Ogdon et al. ............... 709/205 |

(Continued)

FOREIGN PATENT DOCUMENTS

EP     1089201 A1 * 4/2001

(Continued)

OTHER PUBLICATIONS

Everest: Database Management, textbook published by McGraw-Hill, Inc. in 1986, p. 746 (see Figure 18-3).*

(Continued)

*Primary Examiner*—Tariq Hafiz
*Assistant Examiner*—Jonathan G Sterrett
(74) *Attorney, Agent, or Firm*—Vidas, Arrett & Steinkraus

(57) ABSTRACT

The present invention is directed to methods for facilitating video test screening on an electronic visual communications network. One step is to establish a database for a video test screening audience. The database contains audience member information and ID numbers for the audience members. A further step is establishing a test screening audience database. Audience members are selected without regard to the time a person was added to the database, or in a sequence according to the time a person volunteered to serve, or by a combination involving both techniques. Members of the audience are given a special access code to be entered with the member's identification number in order to gain access to the test video for test screening on the network. Verification codes and quizzing of the members may also be used for viewing verification.

17 Claims, 5 Drawing Sheets

U.S. PATENT DOCUMENTS

2004/0260575 A1 * 12/2004 Massey, Jr. .................... 705/1

FOREIGN PATENT DOCUMENTS

| JP | 2001060928 A | * | 3/2001 |
| WO | WO 9904568 A1 | * | 1/1999 |
| WO | WO 200115449 A1 | * | 3/2001 |

OTHER PUBLICATIONS

Haithman, Diane, "The new TV season Attention Shoppers: Fall TV shows are Here Networks and Retailers team up in cross-promotions to trumpet new season; but will viewers buy it?", Aug. 20, 1989, Los Angeles Times, pp. 1-5, ProQuest ID 66529044.*

Berkman, Sue, "Sunburst creates videos to ease family tensions", Westchester Country Business Journal, Aug. 1998, vol. 37, Iss. 35, p. 1, ProQuest ID 44876190.*

Mullen, Megan, "The Pre-History of pay cable television: An Overview and Analysis", Mar. 1999, Historical Journal of Film, Radio and Television, vol. 19, Iss. 1, p. 39, ProQuest ID 40332563.*

"Promotion Helps Stations Interact with Audience", Aug. 1990, Adweek's Marketing Week, v00, n00, p. 44, Dialog 01292168.*

* cited by examiner

TEST SCREENING OF VIDEOS

CROSS-REFERENCE TO RELATED APPLICATIONS

This application claims the priority benefit of provisional application Ser. No. 60/220,744 filed Jul. 26, 2000.

FIELD OF THE INVENTION

This invention relates to improved methods for the test screening of videos, and more particularly to improvements that greatly enhance the speed and convenience of test screening and facilitate video test screening on an electronic visual communications network.

BACKGROUND OF THE INVENTION

Historically, an operator of a test screening effort has labored to select particular people satisfying the demographics of the expected audience for the video and then has collected those persons together in an auditorium for the viewing of the video or equivalent. This especially has been true for test screenings of motion picture type videos. Members or persons in the test audience are then asked to answer special questions, usually presented to them on paper. They turn in their answers (on paper) to the test operator, who tabulates results and supplies the results to the particular person or business that requested the test screening in the first place. Speed has not been a characteristic of this old test procedure, and easy convenience also has not been notable for it. For example, collecting all persons or parties who comprise the test audience in an auditorium for simultaneous viewing of the motion picture to be test screened puts all participants under the inconvenience of setting aside a specific time and place for the test screening. Further, the approach generally limits members of the test audience to a particular geographic area. The cost of test screening as conducted heretofore, when combined with the time it has taken to arrange for test screening, has not been an inducement for the most widespread use of test screening.

Much to be desired has been a way of conducting test screening with speed and great economy, whether in a selected geographic area or a widespread area, and in a quick easy manner with minimal inconvenience for the test audience members, without sacrificing reasonably reliable results. It is to a solution of this problem that this invention is directed.

BRIEF SUMMARY OF THE INVENTION

The methods for facilitating video test screening on an electronic visual communications network have several steps. One is to establish a registrant database of persons who volunteer to serve as a member of a video test screening audience. That database contains the persons name and personal contact information and preferably also demographic information, plus the person's identification number called an ID number. Another main step is that of establishing a test screening audience database of test screening audience members for test screening a particular specific video. Audience members are selected without regard to the time a person was added to the registrant database, or in a sequence according to the time a person volunteered to serve as a member of a test screening audience for a particular specific video, or by a combination involving both techniques. Members of the test audience are given a special access code to be entered with the member's identification number in order to gain access to the particular specific test video for test screening on the network. Test screening may involve exposing an audience member to a verification code at some point in the video, and subsequent quizzing of the member to verify that the member viewed that portion of the video.

A key aspect of the methods of conducting test screening according to the teachings of this invention is that of first establishing, as for example by communication over a computer network or equivalent electronic visual communications network, a registration database of persons (e.g., potential candidate persons) deemed eligible to participate in video test screening on the network. (The ideal network is a global one, such as the Internet, but a non-global electronic communications network may be used.) Persons of the registration database will be those who express an interest in test screening of one or more videos over the network. They will express their interest by volunteering and logging on to become a potential test audience member, and they normally will commit themselves to answer, over such network, a variety of survey questions concerning the video or videos test screened.

Such persons generally will also be required to supply and will supply demographic personal information about themselves, and they normally will be required to acknowledge and will acknowledge that they are obligated to "sign-up" or are willing to participate in the test screening of at least one or more videos, as announcements are posted on the network for the test screening of such videos.

Still further, the invention contemplates assignment to such persons of an identification number called an ID number that they shall in the future use at the time of "signing-up" on the network for test screening of a video.

Where the test screening is to be conducted by audience members satisfying certain demographic criteria, an important step in the method can be that of establishing a candidate database of such persons.

At some point, a database of specific test audience persons for test screening of a particular specific test video is formed, and the selected persons for this database may be from the registration database or from a separate candidate database of registrants who satisfy certain demographic criteria.

It is preferable to supply each test audience member a special access code for that person to enter together with the person's identification number when "signing-on" or accessing a particular test video that the test audience member is to test screen.

Great convenience and economy in conducting the methods of the invention comes from the fact that communication to and from persons serving as test audience members is ideally conducted over an electronic visual communications network such as the Internet or global computer network.

A further significant benefit of the new methods is that each test audience member can be permitted access to a video for test screening at a time convenient for the test audience member, although the preferred option exists to limit test screening to a particular specific time for all test audience members.

Several other advantages become apparent for the new methods taught herein as will be evident as this description proceeds.

DESCRIPTION OF THE PREFERRED EMBODIMENT

Figure 1:
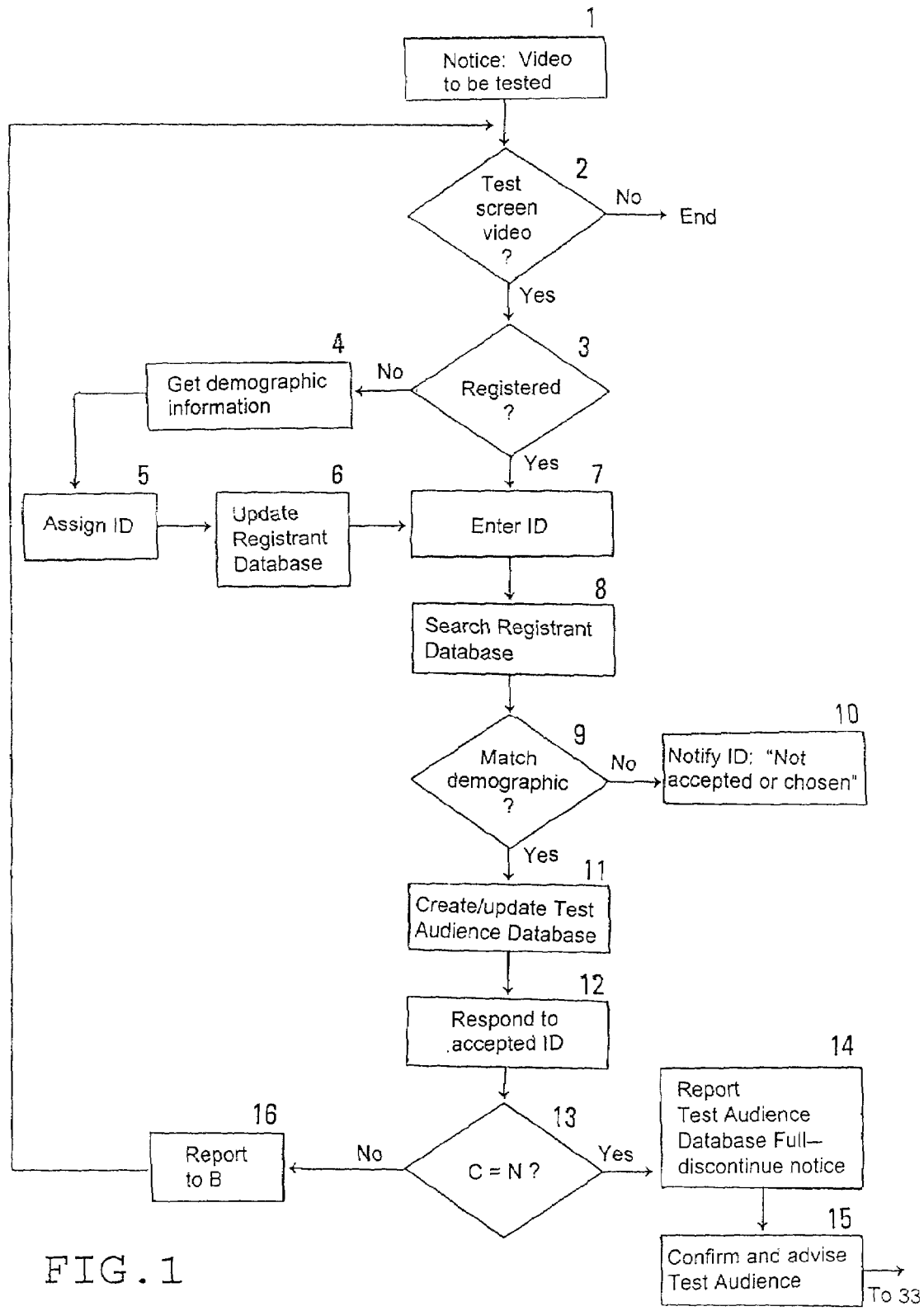
FIGS. 1 through 4, inclusive, illustrate graphically the program steps for conducting various aspects of the new methods for test screening.

Though the preferred purpose of the methods described herein is to test screen aspects of specific videos with an "audience", the teachings herein may be extended for use on a broader scale or in other areas not mentioned in this illustrative description. For instance, the methods may be used generally to test such aspects as the level of sex or violence present on television or in films, etc., by testing a variety of videos with a test audience or focus group.

In the following explanation and in the figures, "A" is the video originator or any entity that desires to have test screening of a video, "B" is the test operator or manager of the screening process, and "C" refers to databases of persons progressing to form an actual test audience or become a member of it. (While the term "audience" is used, it should be kept in mind that the methods described herein are ideally conducted over a global computer network; thus, the "audience" is made up of persons who may be separated from each other such as by time and place.)

The methods involve reference to certain categories of persons, for example: A "registrant" is a person identified in the registrant database. A "test audience member" is a person identified in the test screening audience database.

All databases of the method are computerized, and the following databases are to be particularly noted:

The registrant database stores and contains for each person in it the person's name and personal contact information and the person's identification number called an ID number, plus, at the option of a test operator, the demographic (including personal) information about the person. This database may be composed of more than one part. For example, to increase privacy, a registrant's name and contact information (such as addresses) may be stored in a separate database from the registrant's demographic information (including personal data), with the registrant's ID number as the coordinating code.

The candidate(s) database stores and contains the IDs of registrant persons who match the demographic criteria needed or required or desired for a given test audience or subgroup.

The selected candidate(s) database (sometimes called selected registrant(s) database) stores and contains a smaller number of registrant persons than in the candidates database, and the smaller number is selected (usually randomly) from the candidates database. (The registrants of this database may not have actively volunteered for a particular specific video test screening, but they nevertheless are potential test screening audience members.)

The test audience database (or test screening audience database) stores and contains the IDs of test screening audience members as preliminarily selected as well as those finally selected depending on the text of usage of the term.

If desired, the candidates database, the selected candidates database, and the test audience database may contain only the qualifying IDs, since the corresponding demographic and personal information can always be obtained from the registrant database.

The preferred method for establishing a test audience is to have all potential test audience members registered in a database maintained by the test operator. By this method, the test operator can maintain demographic information about the registrants for use in future test screenings. Newspapers, television, and the Internet may be used to advertise the test screening at the Web site run by the test operator.

The process starts when the video originator (A) submits a video of any type (e.g., movie, TV show, etc.) to be test screened. The test operator works with the video originator to decide what information will be released about the video before the test screening, such as cast, content, length, etc. At this time, the video originator and/or the test operator specify the demographic composition of the test audience or they may leave it "open" to all registrants regardless of demographic information. Included in this composition is a sample size (N) for any specified subgroups (i.e., $N_1$=50, if, for example, the test audience desired is to contain a subgroup of 50 people ages 25–35). Demographic subgroups may be specified by one or multiple forms of demographic identifying information. The video originator must also submit a questionnaire or list of survey questions to be completed by test audience members and decide on a sign-up period for the test screening.

FIG. 1 shows one way the process to form a test audience can work. The process flow chart of FIG. 1 illustrates a method of establishing a test screening audience for a particular specific video by sequentially adding (i.e., in the order of "sign-up" on a first-come, first-served basis) to the test audience those who volunteer for such screening. The test operator (B) notifies the public and earlier registrants that a particular specific video (identified by title or other means such as a number or code or genre or other general description) is to be test screened (block 1). This may be accomplished by means of publishing a notice (announcement) on a Web site run by the test operator (or by e-mail or telephone calls to earlier registrants) asking any persons interested to make their interest known by volunteering (e.g., "signing-up" for the specific test audience).

At the test operator's Web site, the public and the registrants who take notice of the site can see information about the video and answer "Yes" to the screen menu, in order to express their desire to participate (block 2). A "Yes" response opens a menu that asks if the individual is already in the registrant database, that is, already registered with the test operator (block 3). A response of "No" brings up a screen or screens to obtain identifying and contact information (at lease name and address, but also contact information such as e-mail address, telephone number or numbers, both home and business postal addresses, etc.). Additionally, the screens may call for demographic information (at least sex and age, and likely also employment, possibly income level, educational level, possibly the major subject of their education, marital status, etc.), and anything else that may be deemed necessary by the operator for registration (block 4).

Each volunteer may also be asked to select two favorite genres from a list on a screen, or may be asked to rank their genre preferences. The screen menu could, for example, say: Select two of your favorite genres from the following: 1) Drama, 2) Comedy, 3) Thriller, 4) Science fiction, 5) Suspense, 6) Romance. This genre preference information may also be used to establish specific demographic criteria for a particular specific test screening, if specified by the video originator or test operator.

Some who register may ultimately be restricted or excluded for reasons such as employment that may be a conflict of interest. (Optionally, individuals who are not interested in the current test screening(s) may still volunteer and be registered (for consideration regarding subsequent screenings) using a registration menu on the Web site.)

Preferably an agreement stating the obligations of, and restrictions on, registrants should be set forth and signed or acknowledged by the potential registrant and returned to the test operator (either using an e-signature on-line or through the mail). Thereafter, the test operator may review the agreement (e.g., for potential conflict of interest) and accept or reject it. An account or customer number, i.e., an ID number is assigned to each person who is added to the registrant database (which preferably includes only those who sign and return the agreement), and the registrant database is updated to include the ID number and accompanying identifying and contact information, and preferably also the demographic information for the new registrant (blocks 5 and 6). An illustrative ID number may have as many as 9 or more digits or alphanumeric characters. Registrants may be given the option of being registered in the database for only a limited period, such as six months, one year, etc., instead of indefinitely, if desired.

The new registrant may then establish a personal identification number (PIN) (e.g., a number of possibly three, four, or five digits or alphanumeric characters) to provide extra identification and security. Assignment of an ID number makes the registrant eligible to be considered for test screenings as may be posted at the test operator's Web site. The PIN can suitably function as a double identification for security.

When a registrant, who wants to be a test audience member for test screening a particular specific video, answers "Yes" and enters his/her ID number (and optional PIN) to "sign-up" (block 7), his/her demographic information is located or found in the registrant database (block 8) using a suitable data management system. The specified demographic criteria for the particular specific video to be test screened are compared against the records of demographic information of the registrant (block 9). If the specified demographic criteria for the particular test screening do not match the demographic information of the registrant, a message is sent to that registrant (e.g., suitably on line) to the effect that he/she has not been chosen for the test screening (block 10). When the specified demographic criteria do match the demographic information of a registrant, the registrant's ID number is added to a test audience database (appropriately recognized at this point as a preliminary test audience database) (C) (block 11). Thus, for this process, a registrant whose demographic information matches the specified demographic criteria for a particular specific test video becomes a preliminary test audience member for that particular test screening. The preliminary test audience members (known by their IDs) are ideally notified, on-line, that they have been preliminarily accepted and that final confirmation and further information will be forthcoming (block 12). (In instances where specified demographic criteria are left open, registrants may be added directly to the preliminary test audience database as each volunteers for the test screening.)

The preliminary test audience database as it exists in blocks 11 and 12 is compared to the specified predetermined sample size(s) desired for the test audience for the particular specific video to be test screened (block 13). If at some selected time the test audience database (C) contains fewer registrant persons in it than the specified predetermined sample size (N), the software can generate a status report for the test operator (B) (block 16). The process of demographic comparison described above continues until the initially specified (or subsequently adjusted) sample size(s) for test screening the particular specific video are available in the test audience database. When the test audience database contains enough registrant ID records to satisfy the specific sample size(s), no more ID numbers that match that specific demographic criteria (block 9) will normally be accepted (but optionally more may be accepted so as to provide a reservoir of potential test audience members in case some withdraw or fail to perform to a satisfactory level). When all specified sample sizes are filled, a report of "Full" is produced for the test operator. The notice of block 1 will normally then be discontinued either manually or automatically (block 14).

A "Full" test audience database means that all specified sample sizes are met (in a preliminary sense) for the complete test audience (i.e., $N_1+N_2+N_3 \ldots =N_{TestAudience}$) If the video originator did not specify any overall or subgroup demographic requirements for the test audience or used only one demographic criteria for the entire test audience, then a "Full" test audience database means the size at this stage directly matches that of the required test audience (i.e., $N_{TestDatabase}=N_{TestAudience}$).

The test operator notifies and confirms to all members in the preliminary test audience database (by e-mail, telephone, etc.) of the date(s) and time(s) that the particular specific video will be available for viewing (block 15). This can be a fixed time (i.e., a specific time set by the test operator and/or video originator) or a limited period of time (i.e., 48 hours) during which the video will be accessible by a test audience member. Additionally, at this time the test audience members may be asked to confirm their continued interest in serving as a member of the test screening audience database. Also, as part of the confirming notification to these select registrants or members who make up the test audience database, the test operator will normally supply to each an access code for the test audience member to enter at the time of "sign-on" in order to gain access to the test video for the test screening to be performed. Once test audience members are confirmed and given a code for access to the test video (i.e., given the access code), they are considered to be in the final complete test screening audience database composed of test screening audience members.

Figure 2:
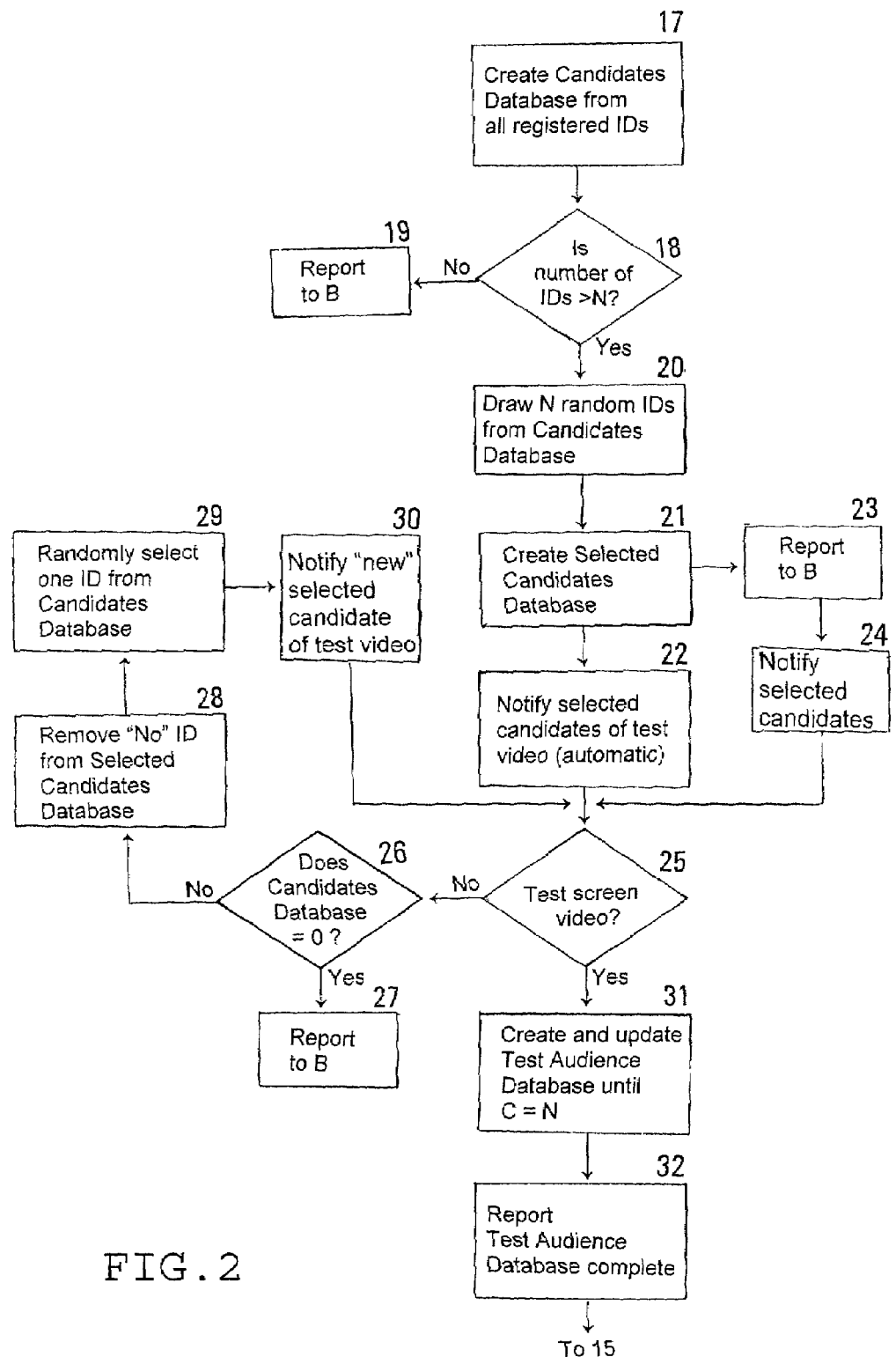

FIG. 2 shows an alternate way to obtain a test screening audience. The registrant database (of volunteers who responded to previous test screening announcements or who previously registered with the operator) is searched to create a database of select registrants (i.e., a candidates database) that match the specified demographic criteria for the test screening audience of the particular specific video to be test screened (block 17). When the specified demographic criteria being used are "open", then all registrants are added (via their IDs) to the candidates database for the particular test screening. If the total number of candidates in the candidates database is less than the specified (predetermined) sample size(s) for the contemplated test screening (whether total audience size or size for demographic subgroup(s)), then a status report is generated for the test operator (B) and adjustments can be made (blocks 18 and 19). Adjustment may reduce the desired audience size if agreeable to the entity A desiring test screening, or may lead to an announcement notice for more volunteers such as, for example, outlined for the procedure illustrated in FIG. 1.

If the candidates database of persons equals or exceeds the number predetermined or desired for a test screening audience, including all demographic subgroups, then the persons (i.e., IDs) of the candidates database as needed to comprise the specified sample size(s) (N or $N_1$, $N_2$, $N_3$ . . . are selected (randomly or otherwise) from this candidates database (block 20). The selected IDs form a selected candidates database (block 21), and at this point, all such selected candidates in this database can be notified automatically (block 22) of their preliminary selection or a report can be generated for the test operator to review before sending and obtaining confirmation and possibly also sending notifications of time, etc., to such selected candidates (blocks 23 and 24). These selected candidates can respond immediately if contacted by telephone, or within a limited time if contacted through a Web site or e-mail, advising of their specific interest in participating as a test screening audience member for the particular specific video under consideration (block 25). This approach is to gain confirmation that those selected candidates are interested in serving in the test screening audience for the particular specific test video. The approach is wise since their initial selection in many instances may have occurred after considerable time has passed following their volunteering for the registrant database.

A selected candidate's (e.g., a select registrant's) entry of a response of "No" (indicating no interest) to the proposed test screening causes the candidates database (block 17) to be checked for another candidate's ID that matches the same demographic criteria (block 26). The ID of selected candidate who gave a response of "No" is removed from the selected candidates database (block 28). If there are no others who qualify for the status of selected candidate in the candidates database (i.e., none matches the same demographic criteria), a report is generated for the test operator so that other arrangements or adjustments can be made (block 27). If one or more qualified candidates are available in the candidates database (i.e., those satisfying the demographic criteria for the audience), then another ID is randomly selected from the candidates database to replace the ID that produced the "No" response (block 29). The selected candidate having the "new" ID is then notified about the test screening, automatically or manually (block 30).

The ID (and preferably also the contact and demographic record) of each selected candidate who responds "Yes" (at block 25) is removed from the selected candidates database (of block 22) and put in a preliminary test audience database of block 31, which is continuously updated until all specified sample sizes are met (i.e., $C_1=N_1$, $C_2=N_2$, etc.), or until the predetermined test audience size is reached ($C=N_{TA}$) if one or no specified sample sizes were used (block 31). When the preliminary test audience database has the number of preliminary test screening audience members to satisfy the sample sizes for the demographic groups desired or required for the test screening, a report is generated for the test operator (block 32). The process continues with notification to all preliminary test audience members of their access codes and the dates and times, etc., that the test video may be accessed for test screening (block 15). Members in the preliminary test audience database become full-fledged test screening audience members in the final complete test screening audience database upon assignment and acceptance of the access code for test screening.

A special option exists for omitting blocks 20 and 21 of FIG. 2 and replacing the selected candidates database of block 22 with the candidates database of block 17. (The candidates database of block 17 contains the IDs of persons satisfying the specific demographic criteria for members of the test audience for the particular specific video to be test screened.) This approach would mean that all candidates (of block 17) would be notified at block 22, and would be allowed to "sign-up" on a "first come, first-served" basis for the preliminary test screening audience database.

Variations of the two processes shown in FIGS. 1 and 2 can also be used. For example, by substituting a candidates database for the test audience database at block 11, a test audience database could be selected randomly from this substituted candidates database at block 11. This approach could be taken after a specified time period for volunteers to sign up ends. Another way is to randomly select IDs for notice of acceptance as members of a test audience at block 12, so that the IDs of the first volunteers or registrants to view the notice at block 1 are not the only ones chosen for the test screening audience database.

The following is an illustrative example of how to form a test audience for use in a particular specific test screening. The originator of a science-fiction video may want to test screen the video in two weeks (i.e., a two-week deadline). Notice then may be given on the Web site announcing a one-week sign-up period for an untitled science-fiction movie. The video originator wants a test audience of more than 100 people, half of whom are science-fiction fans between 20 and 25 years of age and the other half of whom are 17 years of age or older without science-fiction as a favorite genre. If, for example, each demographic subgroup or sample size was 200, the total test audience would be 400. So even if only about 30 percent of each demographic subgroup returns survey questionnaires that are usable, that would still leave over 50 responses to evaluate from each subgroup (or over the 100 total responses needed by the originator).

Registrants who see the notice for test screening of the science-fiction video on the Web site can enter their ID number (and any optional PIN) in order to volunteer or sign-up for the test audience (block 7). When a registrant's ID is entered, a data management system or other technique is used to check the corresponding demographic information for that ID number in the registrant database to determine if the registrant's demographic information matches the specified demographic criteria for one or the other of the subgroups needed to test screen the science-fiction video (block 9). If the demographic information does not match, the registrant receives a message that states that he/she "has not been chosen" (block 10). The IDs of registrants whose demographic information matches one or the other set of specified demographic criteria are put into a candidates database created for the particular test screening (block 11). For this illustration, block 11 is deemed to be a candidates database (comparable to the candidates database of block 17) instead of a test audience database). These candidates are sent a message at the time of sign-up that says they have "been preliminarily accepted as a candidate for the test audience" and that they are to "await final test audience selection" (i.e., selection to the test audience database) (block 12). A specific ID number is only accepted once per test screening sign-up to prevent duplication. This process continues until the deadline for signing up to be a test audience member has passed.

At this point, the candidates databases consists of the IDs and corresponding demographic information for both demographic subgroups. One demographic subgroup is for science-fiction fans between 20 and 25 years of age, and the other is for non science-fiction fans of at least 17 years of age. (Alternatively, a separate database could be used for each subgroup.)

Figure 4:
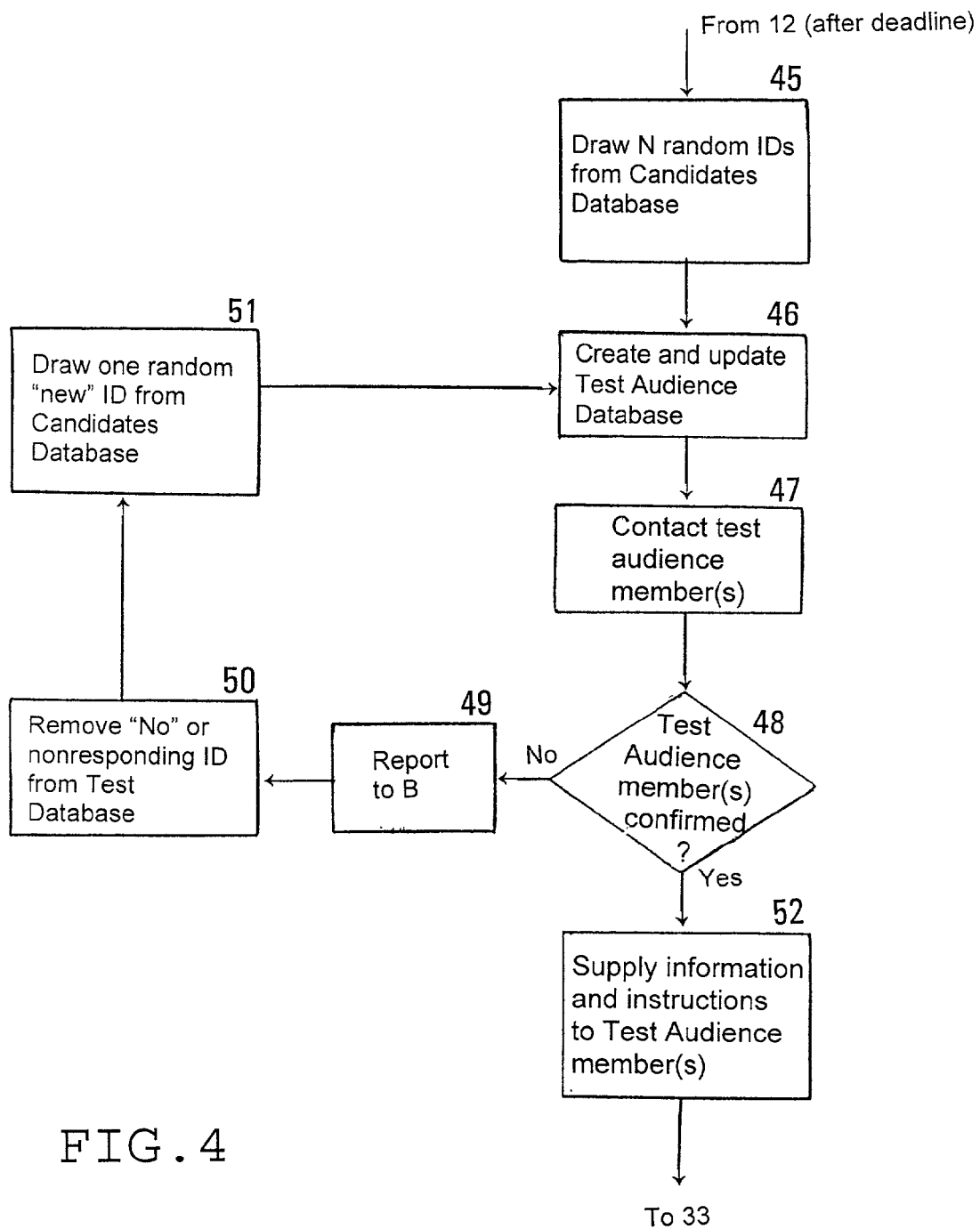

To illustrate how the test audience is chosen, reference is made to FIG. 4. Using a random number generator or any other suitable random selection method, IDs are randomly selected and removed from the candidates database and added to the test audience database (block 46). For example, let us say that the science-fiction fans demographic subgroup consists of 958 IDs and the non-science-fiction demographic subgroup consists of 1,162 IDs when the deadline passes (i.e., the one-week illustrative deadline for the sign-up of registrants to test screen the specific science-fiction video-with the two-week advance notice). The IDs of science-fiction fans may be assigned numbers 1 through 958. To select the 200 IDs ($N_1=200$) for the demographic subgroup of science-fiction fans needed in the test audience database, a random number generator may be used to select 200 numbers from 1 through 958. The IDs with assigned numbers that match one of the numbers selected (and have already matched the specified demographic criteria for science-fiction fans) are removed from the candidate database and added to the test audience database. This same procedure may be used for selecting the non science-fiction fans demographic subgroup for the test audience database with $N_2=200$ and selecting from 1 through 1,162 (the IDs that have already matched the specified demographic criteria for non-science-fiction fans). The total preliminary test audience database now holds the IDs of 400 test audience members (i.e., $N_{TA}=N_1+N_2=200+200=400$) and is complete, with about one week until the test screening.

Preferably, the next step is one of notice of acceptance to the selected preliminary test audience members in the preliminary test audience database (block 47) and that of getting confirmation from them that they will perform (block 48). For example, those test audience members whose IDs have been preliminarily selected are then contacted by telephone or e-mail or through an account on the test operator's Web site to advise of their acceptance and confirm their availability to test screen the video as a test audience member (blocks 47 and 48). Those who do not respond within a specified period (such as 24 hours) can be replaced by a "new" selected test audience member whose ID has been randomly selected (and confirmed) from the appropriate demographic subgroup in the candidates database. The non-responding test audience member's ID will be removed from the preliminary test audience database (block 50), and the "new" test audience member's ID will be added to the test audience database (blocks 51 and 46).

As a follow up to or during the confirmation process (block 48), a test audience member is given information about the test screening (block 52). This may include a video identification title (e.g., TV831), instructions, and the exact date (or dates) and time (or period of time) that the test video will be shown or accessible to test audience members. Each test audience member is given a general or an individual "sign-on" or access code. For example, the access code suitably may consist of a few digits and will allow the test audience member access to the test video within the designated date(s) and time(s) for the particular test screening.

Figure 3:
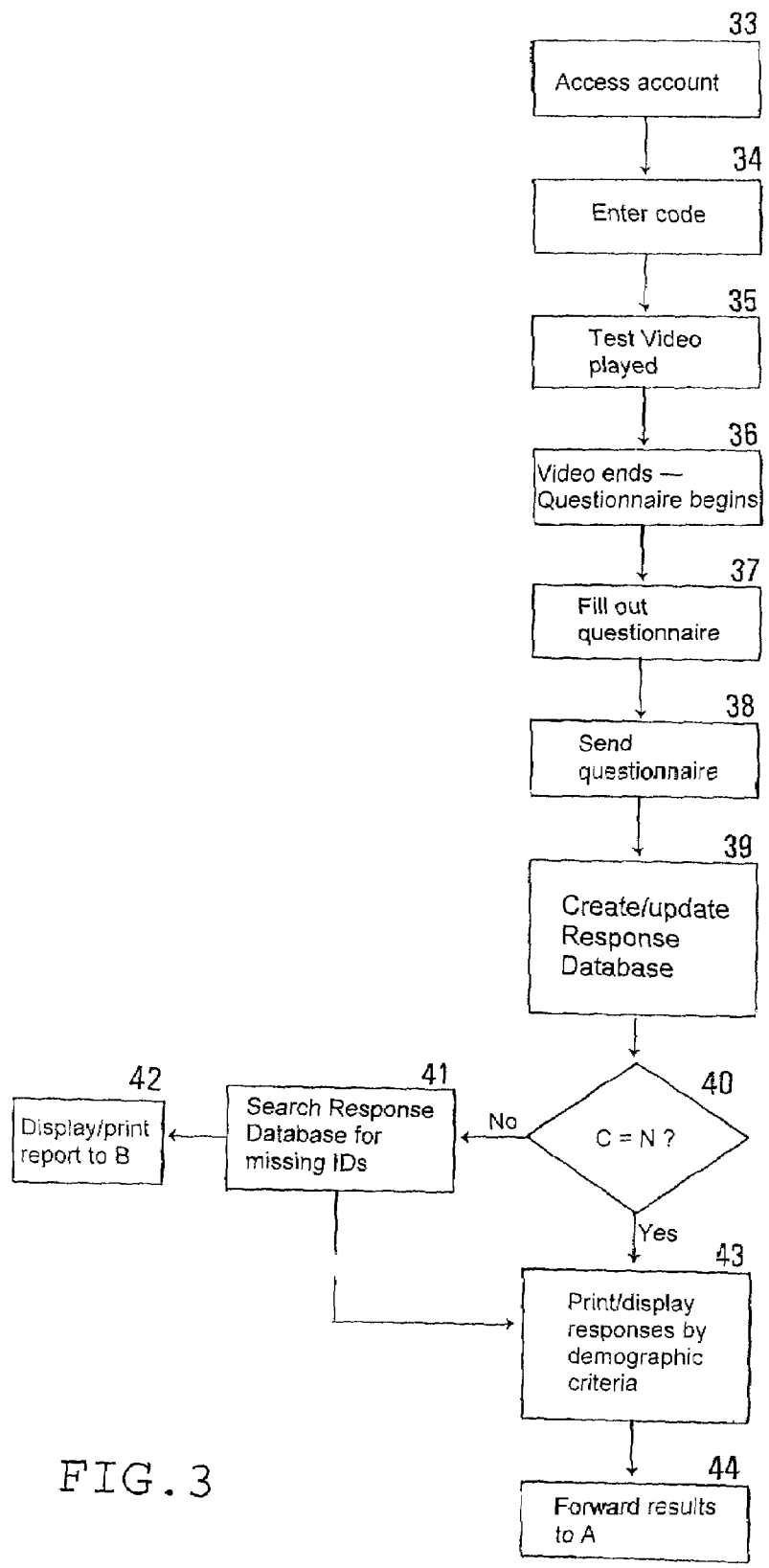

After the test operator's notice to test audience members of their individual access codes and the date(s) and time(s), etc., for viewing the test video (block 15), the process continues as shown in FIG. 3. Within the time of a particular test screening, a test audience member goes to the test operator's Web site and looks in an account for the video identification title to be test screened. This account may be an individual or separate account for each registrant's ID number, or it may be an account that only test audience members may access for a particular test screening by entering a registrant's ID and PIN (personal identification number). After the test audience member enters an ID number and PIN, he/she is prompted to enter the individual access code for the particular test screening (FIG. 3, blocks 33 and 34). Only one individual access code is accepted for each test audience member's ID that is entered, limiting the chance for abuses. Illustratively, an access code entry preferably should be done 10 minutes or more before a fixed time showing of the test video. At some predetermined time period (such as 5 minutes) before the test screening, the test operator may specify that no more sign-ons or access code entries will be allowed. This limitation may be desirable to prevent the test audience members from missing portions of the test video that they are expected to test screen.

Before the test video is played, a test audience member is given any last-minute instructions on how the particular test screening will be conducted. The test video (such as a movie, TV show, etc.) is then shown to the "signed on" test audience member via a global computer network such as the Internet (or some other electronic communications network), using the original format of the video (e.g., widescreen for films) (block 35). One possible feature may be the option to pause the test video for a limited "break" during a test screening that is not a fixed time showing. At an arbitrary point or points in the test video, a verification code word or number may be displayed (e.g., in one corner of the screen) for approximately two minutes. This verification code can be used later to check that the test video was actually viewed by the reporting test audience member.

Figure 5:
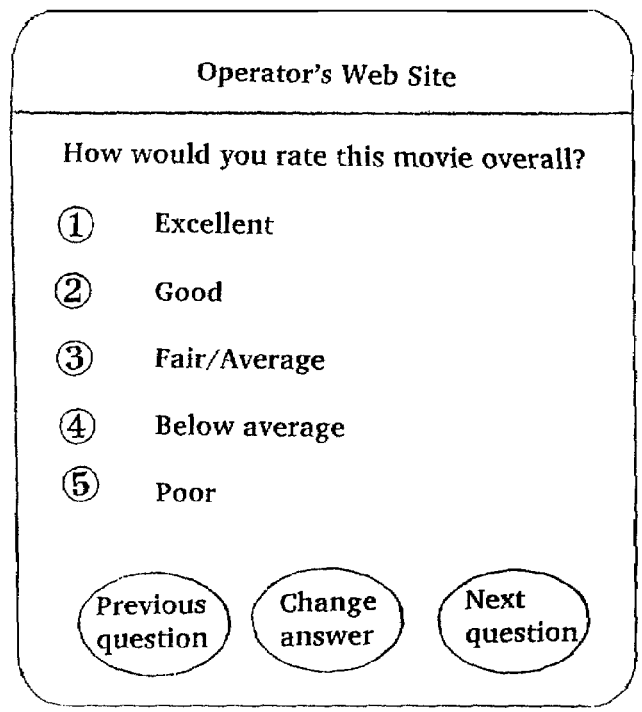
FIGS. 5 and 6 show illustrative screens presented for a test audience member to use in communicating his/her answers and comments to survey questions.

When the test video ends, the test audience member may be prompted to enter the verification code shown during the test screening or to "click" an on-screen button to continue (block 36). The program leads to a series of option menus that take each test audience member through a menu-type questionnaire or survey where each test audience member answers questions (e.g., rate specific features using a range of 1–5 or 1–10); see FIG. 5 for illustration. These menus may include rating such aspects as the quality of the over-all movie, the story line, the characters, and the ending (block 37). For example, the questions could include the following:

1) How would you rate the special effects used in the film? (1=poor–10=excellent).
2) The plot of the film was easy to follow (1=strongly disagree–5=strongly agree).

Figure 6:
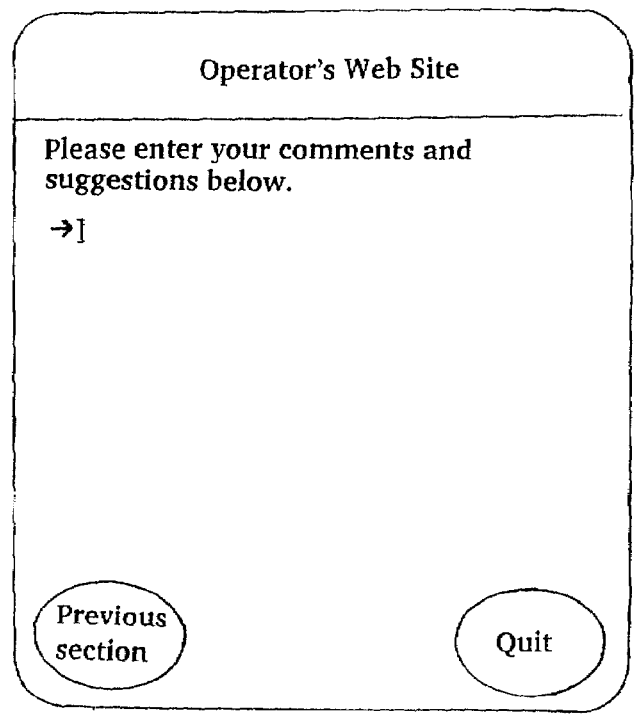

The rating can be done using any specified rating scales. Responses to open-ended questions that were submitted by the video originator and any comments and suggestions section as may also be desired should follow or "come up" after the rating portion of the questionnaire is completed; see FIG. 6 for illustration.

After completing the questionnaire, a test audience member can "click" on a "Send" or "Quit" menu option that sends the response information to the test operator (block 38). An e-signature can be considered the legal equivalent of a person's name and could be used to verify action by the test audience member when the response information is sent back. Returned responses are suitably transferred to a response database so that a suitable data management system can tabulate results in terms of an average or mean rating for each aspect questioned (block 39). If the number of completed questionnaires does not equal the number of test audience members when the test screening for the particular specific video is complete, the response database is searched for missing IDs (40 and 41). Any non-responding IDs that were picked out by the system are reported to the test operator who can determine which test audience members may not have completed their questionnaires (block 42). Non-responding test audience members who fail to complete questionnaires can in the future be banned from participating in test screening.

All of the usable data from the responding test audience members is sorted so that only the responses and the corresponding demographic information are reported (block 43). Final averages for rating questions can be determined (on a spread sheet type of application or equivalent) for the entire test audience and for any demographic subgroup. These subgroups may be based on the specified demographic criteria or, if desired, other demographic information that any test audience members may have in common. Written answers, comments, and suggestions may be paired with the demographic information of the ID number from which it originated (block 43).

In any instance where a fixed time is used for showing the test video, the test operator can give the video originator the option of holding a "chat room" discussion with the test audience members after they have completed the test screening. Using a secure account on the test operator's Web site, the video originator and test audience members could then discuss the positives and negatives of the test video.

A summary of the final results and the written responses are then forwarded to the video originator, completing the test screening process (block 44).

The completed questionnaires and possible discussion should provide the video originator the test screening information desired about the test video. The information may then be used by the video originator for determining a target audience, viewer appeal, or for any other useful purpose.

The test screening of new and/or unreleased videos may provide adequate enticement for persons to register with the test operator and sign-up to participate in a particular test screening. However, in order to attract more persons to register and then sign-up for particular test screenings, an honorarium may be given to those test audience members who have completed a particular test screening. The honorarium may, for example, be a free ticket to a movie or a free pay-per-view video over the Internet or comparable network.

Those skilled in the art will readily recognize that this invention may be embodied in still other specific forms than illustrated without departing from the spirit or essential characteristics of it. The illustrated embodiments are therefore to be considered in all respects illustrative and not restrictive, and the claims below are to be construed broadly and entitled to equivalents.

That which is claimed is:

1. In a method for facilitating video test screening on an electronic visual communications network, the steps comprising:
   (i) establishing a registrant database of persons who volunteer to serve as a member of a test screening audience for video test screening on said network, said registrant database containing for each said person,
      (a) the person's name and personal contact information, and
      (b) the person's identification number called an ID number,
   (ii) establishing a test screening audience database of test screening audience members for test screening a particular specific video,
      (a) wherein said test screening audience members are selected from persons in said registrant database by a procedure involving one or more of the following techniques:
         A. selection without regard to the time a person was added to said registrant database, and
         B. sequential selection in the order in which a person volunteered to serve as a member of a test screening audience for said particular specific video, and
      (b) wherein said test screening audience database is limited to members who accept assignment to them of a special access code to be entered by said member together with the member's identification number in order to gain access to the particular specific video for test screening on said network, and
   (iii) conducting test screening of said particular specific video, wherein said particular specific video is a production or post-production videos, on said network by steps involving
      (a) entering by a test screening audience member his or her identification number and access code, to thereby obtain access by said test screening audience member to the particular specific video under screen testing,
      (b) providing on-line responses by test screening audience members to questions about the video of the test screening, and
      (c) obtaining the on-line responses from the test screening audience member about the particular specific video after they have screened it and storing the responses
      (d) obtaining prior commitments from the test screening audience members to watch the entire test video and ensuring that the test audience members watch the entire test video by displaying in the video under screen testing a verification code for a limited time without advance notice to any members of the test screening audience, and the step of quizzing members of the test screening audience about said verification code, to thereby learn if any member of the test screening audience failed to view a portion of the video containing the verification code.

2. In the method of claim 1, the additional step of publishing an announcement that any person desiring to serve as a member of a video test screening audience on said network should volunteer for such service.

3. In the method of claim 1, the additional step of conducting a post viewing discussion after the particular specific video is test screened.

4. In the method of claim 1, the further step of adding demographic information for persons in said registrant data base.

5. In the method of claim 4, the additional step of pre-establishing demographic requirements for said members of said test screening audience for said particular specific video, and wherein selection of said members of said test screening audience is from persons whose demographics satisfy said demographic requirements.

6. In the method of claim 5, the step of establishing, before establishing said test screening audience database, a selected candidate database composed of persons registered in said registrant database whose demographics satisfy said demographic requirements.

7. In the method of claim 6, the step of replacing persons in the selected candidate database with other persons from said registrant database whose demographics satisfy the demographic requirements pre-established for the test screening of said particular specific video whenever a person initially placed in said selected candidate database declines or fails to serve.

8. In the method of claim 1, the additional step of obtaining agreement by a volunteering person to abide by a set of pre-established conditions for video test screening before including such person in the registrant database.

9. In the method of claim 1, the step of pre-determining a minimum number of persons to be included in said test screening audience database before establishing said database and using the minimum of persons in conducting the test screening.

10. In a method for facilitating video test screening on an electronic visual communications network, the steps comprising:
   (i) publishing an announcement that any person desiring to serve as a member of a video test screening audience on said network should volunteer for such service,
   (ii) establishing a registrant database of persons who volunteer and are deemed potentially eligible to participate in video test screening on said network, said registrant database containing for each person in it,
      (a) the persons name and personal contact information and demographic information, and
      (b) the person's identification number called an ID number,
   (iii) establishing, before forming a test screening audience database of test audience members for test screening a particular specific video, a selected candidate database composed of persons registered in said registrant database whose demographics satisfy the demographic requirements pre-established for members of a test screening audience for said particular specific video, said selected candidate database of persons being formed by a procedure involving one or more of the following techniques:
      (a) selection without regard to the time a person was added to said registrant database, and
      (b) sequential selection in the order in which a person volunteered to serve as a member of the test screening audience for said particular specific video,
   (iv) establishing a test screening audience database of test screening audience members for test screening said particular specific video by selecting persons from said selected candidate database who accept assignment to them of a special access code to be entered by said member together with the member's identification number in order to gain access to the particular specific video for test screening on said network, and
   (v) conducting test screening of said particular specific video, wherein said particular specific video is a production or post-production videos, on said network by steps involving
      (a) entering by a test screening audience member his or her identification number and access code, to thereby obtain access by test screening audience member to the particular specific video under screen testing,
      (b) providing on-line responses by test audience members to questions about the video of the test screening, and
      (c) tabulating the responses by test screening audience members into a report of the responses
      (d) obtaining prior commitments from the test screening audience members to watch the entire test video and ensuring that the test audience members watch the entire test video by displaying in the video under screen testing a verification code for a limited time without advance notice to any members of the test screening audience, and the step of quizzing members of the test screening audience about said verification code, to thereby learn if any member of the test screening audience failed to view a portion of the video containing the verification code.

11. In the method of claim 10, the additional step of obtaining agreement by a volunteering person to abide by a set of pre-established conditions for video test screening before including such person in the registrant database.

12. In the method of claim 10, the step of predetermining the number of persons to be included in said test screening audience database before establishing said database.

13. In the method of claim 10, the step of replacing persons in the selected candidate database with other persons from said registrant database whose demographics satisfy the demographic requirements pre-established for the test screening of said particular specific video-whenever a person initially placed in said selected candidate database declines or fails to serve.

14. In the method of claim 1, wherein the particular specific video provided for the test screening audience members is provided regardless of their particular video interests or likes.

15. In the method of claim 1, wherein the questions about the video of the test screening include questions about specific aspects of the particular specific video.

16. In the method of claim 10, wherein the particular specific video provided for the test screening audience members is provided regardless of their particular video interests or likes.

17. In the method of claim 10, wherein the questions about the video of the test screening include questions about specific aspects of the particular specific video.

* * * * *